US007265693B2

United States Patent
Yi

(10) Patent No.: US 7,265,693 B2
(45) Date of Patent: Sep. 4, 2007

(54) METHOD AND APPARATUS FOR DETECTING POSITION OF MOVABLE DEVICE

(75) Inventor: Kyoung-mok Yi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 11/441,345

(22) Filed: May 26, 2006

(65) Prior Publication Data
US 2006/0271334 A1 Nov. 30, 2006

(30) Foreign Application Priority Data
May 27, 2005 (KR) ...................... 10-2005-0045201

(51) Int. Cl.
*H03M 1/48* (2006.01)
(52) U.S. Cl. .................. 341/111; 341/98; 702/141; 702/150
(58) Field of Classification Search ........... 341/111; 702/150
See application file for complete search history.

(56) References Cited

U.S. PATENT DOCUMENTS 5,819,206 A * 10/1998 Horton et al. .............. 702/150
5,987,983 A * 11/1999 Ariav et al. .................. 73/488
6,554,395 B2 * 4/2003 Cole et al. .................... 347/37
6,556,153 B1 * 4/2003 Cardamone ................. 341/111
7,020,575 B2 * 3/2006 Hagl .......................... 702/150

FOREIGN PATENT DOCUMENTS

| JP | 2002-370418 | 12/2002 |
| KR | 1020050003709 A | 1/2005 |
| KR | 1020050010649 A | 1/2005 |

\* cited by examiner

*Primary Examiner*—Khai M. Nguyen
(74) *Attorney, Agent, or Firm*—Roylance, Abrams, Berdo & Goodman, L.L.P.

(57) ABSTRACT

A method and apparatus for detecting the position of a movable device are provided, in which an acceleration signal of the movable device is obtained and the acceleration signal is converted to a digital signal using an acceleration sensor; a high level time of the digital signal is counted, based on a predetermined frequency; the absolute displacement of the movable device is calculated by integrating the counted high level time of the digital signal twice; and the absolute displacement is converted to a binary gray code and the binary gray code is output.

17 Claims, 4 Drawing Sheets

METHOD AND APPARATUS FOR DETECTING POSITION OF MOVABLE DEVICE

CROSS-REFERENCE TO RELATED PATENT APPLICATION

This application claims the benefit under 35 U.S.C. § 119(a) of Korean Patent Application No. 10-2005-0045201, filed on May 27, 2005, in the Korean Intellectual Property Office, the entire disclosure of which is hereby incorporated by reference.

BACKGROUND OF THE INVENTION

1. Field of the Invention

The present invention relates to the position detection of a movable device. More particularly, the present invention relates to a movable device position detection method and apparatus for detecting the position of a movable device, such as an input device (that is, a mouse or a joystick) or an output device of a portable printer, using an acceleration sensor.

2. Description of the Related Art

To detect the position of a moving input device, such as a mouse or a joystick, an encoder or an inertia sensor is used. However, the encoder has a short lifespan since it is sensitive to mechanical abrasion. The inertia sensor uses a microprocessor to calculate the position of the input device by obtaining an acceleration signal and an angular velocity signal for each coordinate axis. However, to use the inertia sensor, many input/output ports are required to obtain each of the acceleration signals and angular velocity signals of the input device. In addition, the microprocessor takes a long time to synthetically calculate the position of a movable device and transmit the acceleration information through a serial port, due to the amount of information.

SUMMARY OF THE INVENTION

An aspect of exemplary embodiments of the present invention is to address at least the above problems and/or disadvantages and to provide at least the advantages described below. Accordingly, an aspect of exemplary embodiments of the present invention is to provide a movable device position detection method and apparatus for calculating an absolute displacement using an acceleration sensor, converting the change of the absolute displacement to a binary code, and outputting the binary code, so that the position of a movable device can be more quickly known with only a few input/output ports.

According to an aspect of exemplary embodiments the present invention, there is provided a method of detecting the position of a movable device, in which an acceleration signal of the movable device is obtained and the acceleration signal is converted to a digital signal using an acceleration sensor; a high level time of the digital signal is counted, based on a predetermined frequency; an absolute displacement of the movable device is calculated by integrating the counted high level time of the digital signal twice; and the absolute displacement is converted to a binary gray code and the binary gray code is output.

In an exemplary implementation, the digital signal may contain acceleration information as a change of duty ratio.

In another exemplary implementation, the binary gray code may be represented by binary values of two channels.

In still another exemplary implementation, a change of an absolute displacement of the movable device is calculated; and the change to a binary gray code is converted and the binary gray code is output.

In a further exemplary implementation, if the change is negative, a rotate order of the binary gray code may be reversed so that the binary gray code rotated in reverse is output.

In an exemplary implementation, before the obtaining of the acceleration signal, a coordinate axis of the acceleration sensor is adjusted to be parallel to a coordinate axis of the movable device.

According to another aspect of exemplary embodiments of the present invention, there is provided an apparatus for detecting the position of a movable device, the apparatus comprising an acceleration sensor obtains an acceleration signal of the movable device and converts the acceleration signal to a digital signal; a high level counter counts a high level time of the digital signal, based on a predetermined frequency; an integrator calculates the absolute displacement of the movable device by integrating the counted high level time of the digital signal twice; and a displacement converter converts the absolute displacement to a binary gray code and outputs the binary gray code.

According to another aspect of exemplary embodiments of the present invention, there is provided a computer readable medium recorded thereon a computer readable program for performing the method of detecting the position of a movable device.

BRIEF DESCRIPTION OF THE DRAWINGS

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
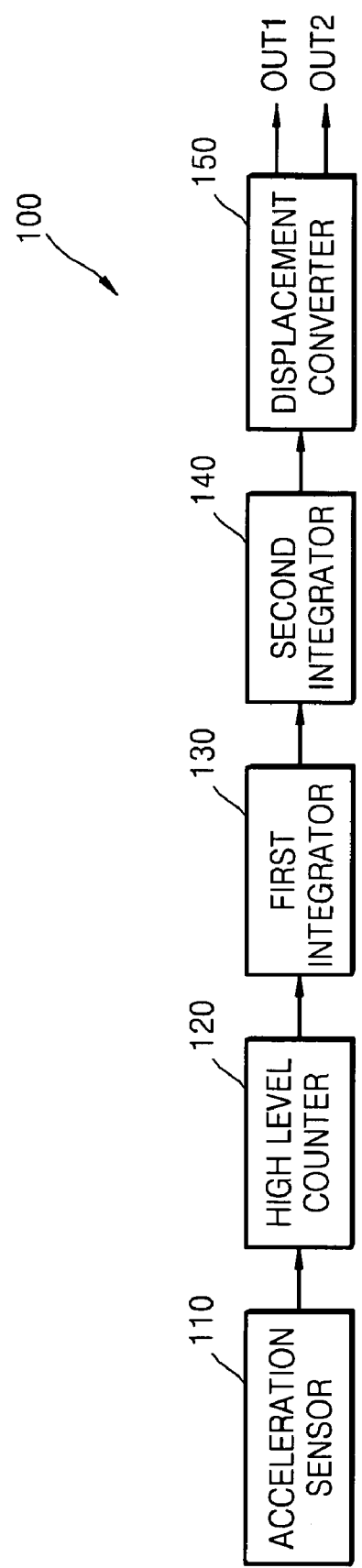
FIG. 1 is a block diagram of an apparatus for detecting the position of a movable device according to an exemplary embodiment of the present invention.

FIG. 1 is a block diagram of an apparatus 100 for detecting the position of a movable device according to an exemplary embodiment of the present invention.

Referring to FIG. 1, the apparatus 100 includes an acceleration sensor 110, high level counter 120, first integrator 130, second integrator 140, and displacement converter 150.

The acceleration sensor 110 obtains an acceleration signal according to the motion of a movable device, converts the acceleration signal to a digital signal, and outputs the digital signal. The digital signal contains acceleration information as a duty ratio. For example, the acceleration of a digital signal whose duty ratio is 50% is set to 0 g (g denotes the acceleration of gravity), the acceleration of a digital signal whose duty ratio is 30% is set to −1 g, and the acceleration of a digital signal whose duty ratio is 70% is set to +1 g.

The high level counter 120 counts a high level time of the digital signal based on a predetermined frequency. The high level counter 120 may simply represent the acceleration information by counting the high level time using a tick time count. For example, when the tick time count per 1 g is 200, a tick time count of 2000 indicates that the acceleration information is 10 g. In an exemplary implementation, when the tick time count corresponding to the reference point 0 g is 1000, the tick time count 2000 indicates acceleration information of 5 g.

The first integrator 130 calculates velocity by integrating the counted high level time of the digital signal indicating the acceleration information. The second integrator 140 calculates an absolute displacement of position information of the movable device by integrating the output of the first integrator 130.

The displacement converter 150 converts the absolute displacement to a binary gray code and outputs the binary gray code. The binary gray code is represented as binary values of two channels, such as, a first channel OUT1 and a second channel OUT2.

Figure 2:
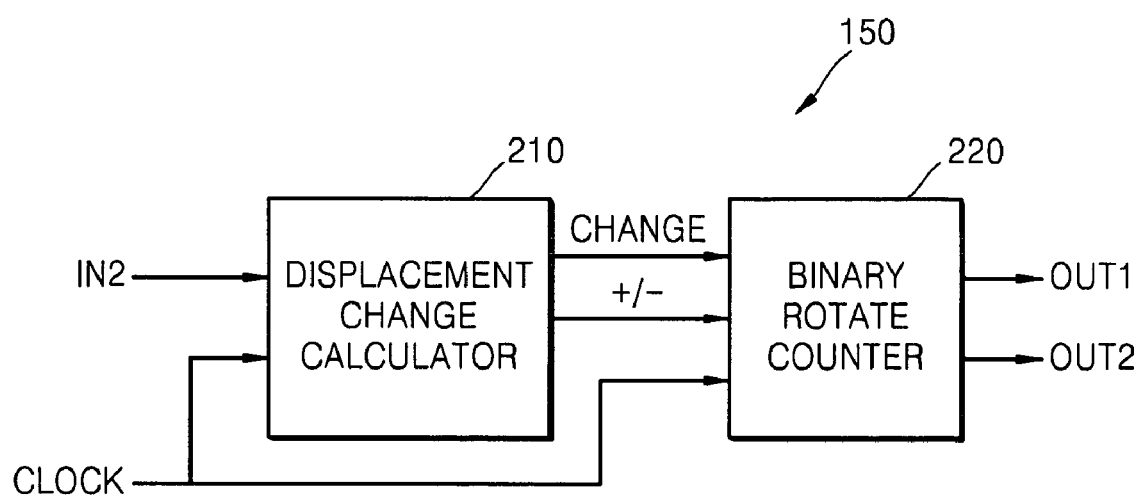
FIG. 2 is a block diagram of a displacement converter illustrated in FIG. 1.

FIG. 2 is a block diagram of the displacement converter 150 illustrated in FIG. 1.

Referring to FIG. 2, the displacement converter 150 includes a displacement change calculator 210 and a binary rotate counter 220.

The displacement change calculator 210 calculates the change of an absolute displacement of the movable device at every clock cycle from the absolute displacement IN2, which is the output of the second integrator 140, and outputs the calculated change. The binary rotate counter 220 converts the change to a binary gray code and outputs the binary gray code. When the change of the absolute displacement IN2 is negative, the binary rotate counter 220 outputs the binary gray code by reversing a rotate order of the binary gray code. An increase or decrease of the displacement can be known from the output of the binary rotate counter 220. Two channel values, which are the output of the binary rotate counter 220, are sequentially changed from 00→10→11→11→01→00 or the reverse. This sequential change is converted to an increasing or decreasing value of the displacement, and a unit of the change of the displacement is determined by a sensor performance.

Since the output of the binary rotate counter 220 indicates a change of an absolute displacement for one axis, in order to determine the position of the movable device in two dimensions, the 2-dimensional position of the movable device may be determined by synthetically calculating outputs of the binary rotate counter 220 for the X axis and the Y axis, using a microprocessor (not shown).

Figure 3:
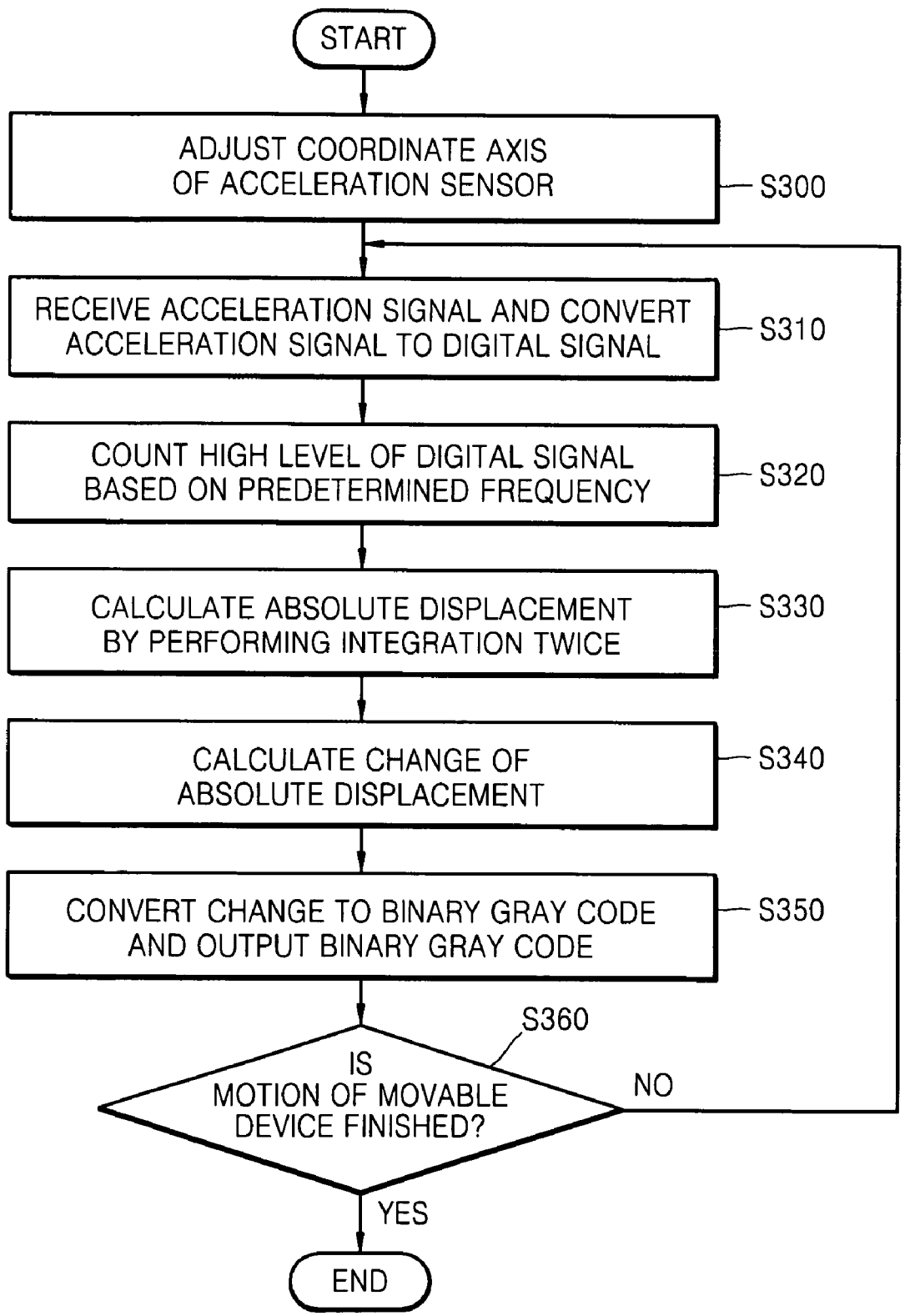
FIG. 3 is a flowchart illustrating a method of detecting the position of a movable device according to an exemplary embodiment of the present invention.

FIG. 3 is a flowchart illustrating a method of detecting the position of a movable device according to an exemplary embodiment of the present invention. The method will now be described by referring to components of FIGS. 1 and 2.

Referring to FIGS. 1 and 3, in operation S300, the coordinate axis of the acceleration sensor 110 is adjusted. For example, if the movable device moves in two dimensions, the coordinate axis of the acceleration sensor 110 is adjusted so that the X axis and the Y axis of the acceleration sensor 110 are parallel to the X axis and the Y axis of the movable device in which the acceleration sensor 110 is fitted.

In operation S310, the acceleration sensor 110 obtains an acceleration signal according to the motion of the movable device, converts the acceleration signal to a digital signal, and outputs the digital signal. The digital signal contains acceleration information as a duty ratio.

In operation S320, the high level counter 120 counts the high level time of the digital signal based on a predetermined frequency and converts the high level time to a simple digit value representing the tick time count. For example, if the count of the high level time of a digital signal whose duty ratio is 50% using the tick time clock cycle is 10, the count of the high level time of a digital signal whose duty ratio is 70% is 14.

In operation S330, the first integrator 130 and the second integrator 140 calculate the absolute displacement of the movable device. The first integrator 130 calculates velocity by integrating the change of the tick time count, and the second integrator 140 calculates the absolute displacement of the movable device by integrating the velocity change.

In operation S340, the displacement change calculator 210 calculates the change of the absolute displacement of the movable device. The displacement change calculator 210 receives the absolute displacement from the second integrator 140, stores the received absolute displacement, and calculates the difference obtained by subtracting the previous displacement from the present displacement. If the calculation result is positive, the displacement is increased, and if the calculation result is negative, the displacement is decreased. The displacement change calculator 210 outputs the obtained change and positive/negative number information to the binary rotate counter 220.

Figure 4:
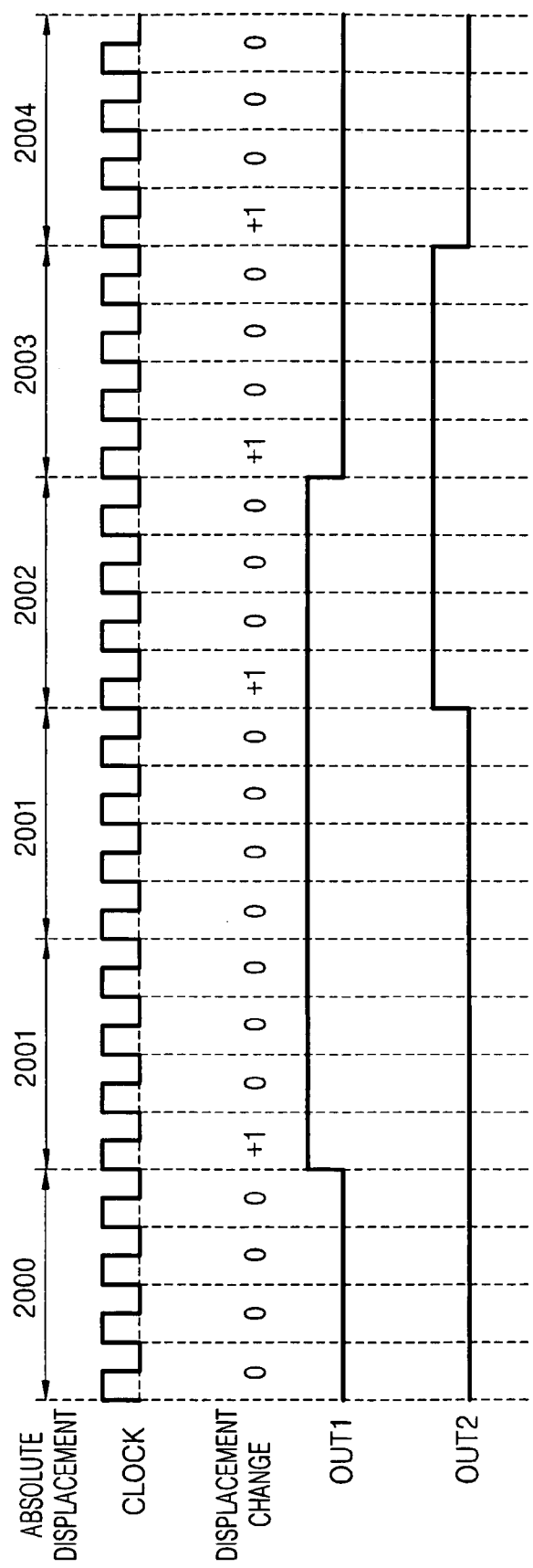
FIG. 4 is a timing diagram illustrating the conversion of an absolute displacement of a movable device to a binary gray code.

FIG. 4 is a timing diagram illustrating the conversion of the absolute displacement of a movable device to a binary gray code. As shown in FIG. 4, an assumption may be made that the absolute displacement calculated by double integration is 2000→2001→2002→2003→2004→ . . . . In an exemplary implementation, the absolute displacement increases or decreases by 0 or 1. If acceleration or deceleration is faster than the sensing capability of the sensor, the increase or decrease can be more than 1. The displacement change calculator 210 calculates the displacement change at every input clock cycle. In an exemplary implementation, the clock cycle should be shorter than the sampling cycle of the sensor. If the clock cycle is longer than the sampling cycle of the sensor, the exact position of the movable device cannot be detected. In FIG. 4, the change of the absolute displacement is 1 at a 5th clock cycle, 13th clock cycle, 17th clock cycle, and 21st clock cycle, and 0 at the other clock cycles. Since the change is 0 at a 9th clock cycle, the moving speed of the movable device is known to decrease in a section between the 5th clock cycle and a 12th clock cycle, unlike the other sections.

In operation S350, the binary rotate counter 220 converts the change of the absolute displacement to a binary gray code and outputs the binary gray code. The binary rotate counter 220 outputs the binary gray code in the order of 00→10→11→01→00 while rotating the binary gray code by the calculated displacement change at every clock cycle. When the change is negative, the binary rotate counter 220 outputs the binary gray code by reversing the rotate order of the binary gray code. In FIG. 4, the binary code of the two channels OUT1 and OUT2 is output in the order of 00→10→10→11→01→00 according to the change of the absolute displacement. The movement distance can be calculated using a conventional method by using the binary gray code output of the two channels OUT1 and OUT2. The movement distance can be obtained by multiplying a distance per pulse period by the number of pulses. The distance per pulse period is determined when a system is designed.

The present invention may include a general-purpose computer (including all devices having an information processing function) by running a program from a computer-readable medium, including but not limited to storage media such as magnetic storage media (that is, ROMs, RAMs, floppy disks, magnetic tapes, etc.), optically readable media (that is, CD-ROMs, DVDs, and the like), and carrier waves (that is, transmission over the internet).

As described above, according to exemplary embodiments of the present invention, by calculating the absolute displacement of a movable device from acceleration information obtained using an acceleration sensor, converting a change of the absolute displacement to a binary gray code, and outputting the converted binary gray code, fewer input/output ports may be used and the position of the movable device may be more quickly detected. Additionally, in the position detection method and apparatus according to exemplary embodiments of the present invention, resources of a microprocessor may be reduced and an existing software platform may be used without modification.

While this invention has been shown and described with reference to certain exemplary embodiments thereof, it will be understood by those skilled in the art that various changes in form and details may be made therein without departing from the spirit and scope of the invention as defined by the appended claims.

What is claimed is:

1. A method of detecting the position of a movable device, the method comprising:
   obtaining an acceleration signal of the movable device and converting the acceleration signal to a digital signal;
   counting a high level time of the digital signal;
   calculating an absolute displacement of the movable device by integrating the counted high level time of the digital signal twice; and
   converting the absolute displacement to a binary gray code and outputting the binary gray code.

2. The method of claim 1, wherein the digital signal comprises acceleration information as a change of duty ratio.

3. The method of claim 1, wherein the binary gray code comprises binary values of two channels.

4. The method of claim 1, wherein the converting and outputting comprises:
   calculating a change of an absolute displacement of the movable device; and
   converting the change to a binary gray code and outputting the binary gray code.

5. The method of claims 4, wherein in the converting and outputting, if the change is negative, a rotate order of the binary gray code is reversed, whereby the binary gray code rotated in reverse is output.

6. The method of claim 1, further comprising, before the obtaining of the acceleration signal, adjusting a coordinate axis of the acceleration sensor to be parallel to a coordinate axis of the movable device.

7. The method of claim 1, wherein the acceleration signal is converted to a digital signal using an acceleration sensor.

8. The method of claim 1, wherein the high level time of the digital signal is counted based on a frequency.

9. An apparatus for detecting the position of a movable device, the apparatus comprising:
   an acceleration sensor for obtaining an acceleration signal of the movable device and converting the acceleration signal to a digital signal;
   a high level counter for counting a high level time of the digital signal;
   an integrator for calculating the absolute displacement of the movable device by integrating the counted high level time of the digital signal twice; and
   a displacement converter for converting the absolute displacement to a binary gray code and outputting the binary gray code.

10. The apparatus of claim 9, wherein the digital signal comprises acceleration information as a change of duty ratio.

11. The apparatus of claim 9, wherein the binary gray code comprises binary values of two channels.

12. The apparatus of claim 9, wherein the displacement converter comprises:
    a displacement change calculator for calculating the change of the absolute displacement of the movable device; and
    a binary rotate counter for converting the change to a binary gray code and outputting the binary gray code.

13. The apparatus of claim 12, wherein the binary rotate counter outputs the binary gray code by reversing a rotate order of the binary gray code, if the change is negative.

14. The apparatus of claim 9, wherein the high level time of the digital signal is counted based on a frequency.

15. A computer readable medium recorded thereon a computer readable program for performing a method of detecting the position of a movable device, the method comprising:
    obtaining an acceleration signal of the movable device and converting the acceleration signal to a digital signal;
    counting a high level time of the digital signal;
    calculating an absolute displacement of the movable device by integrating the counted high level time of the digital signal twice; and
    converting the absolute displacement to a binary gray code and outputting the binary gray code.

16. The method of claim 15, wherein the acceleration signal is converted to a digital signal using an acceleration sensor.

17. The method of claim 15, wherein the high level time of the digital signal is counted based on a frequency.

* * * * *